United States Patent
Lopez et al.

(10) Patent No.: US 6,491,077 B1
(45) Date of Patent: Dec. 10, 2002

(54) TIRE WITH SPECIFIED CROWN REINFORCEMENT AND CARCASS PROFILE

(75) Inventors: José Merino Lopez, Riom (FR); Pascal Auxerre, Royat (FR)

(73) Assignee: Compagnie Generale Des Establissements Michelin-Michelin & Cie, Clermont-Ferrand Cedex (FR)

(*) Notice: Subject to any disclaimer, the term of this patent is extended or adjusted under 35 U.S.C. 154(b) by 85 days.

(21) Appl. No.: 09/711,203

(22) Filed: Nov. 9, 2000

Related U.S. Application Data

(63) Continuation of application No. PCT/EP99/02910, filed on Apr. 29, 1999.

(30) Foreign Application Priority Data

May 11, 1998 (FR) .............................................. 98 06001

(51) Int. Cl.[7] .............................. B60C 3/00; B60C 3/04; B60C 13/00; B60C 15/00; B60C 15/024
(52) U.S. Cl. ..................... 152/454; 152/531; 152/538; 152/539; 152/540; 152/543; 152/544; 152/548; 152/550; 152/554; 152/555
(58) Field of Search ................................ 152/454, 548, 152/544, 531, 539, 540, 538, 534, 555, 554, 550, 543, 453

(56) References Cited

U.S. PATENT DOCUMENTS

| | | | |
|---|---|---|---|
| 1,921,772 A | | 8/1933 | Paull |
| 2,037,640 A | | 4/1936 | MacMillan |
| 2,811,191 A | * | 10/1957 | Comstock .................... 152/454 |
| 3,486,547 A | | 12/1969 | Powers |
| 3,631,913 A | | 1/1972 | Boileau |
| 4,029,139 A | | 6/1977 | Abbott |

FOREIGN PATENT DOCUMENTS

FR 1267264 11/1961

* cited by examiner

*Primary Examiner*—Adrienne C. Johnstone
(74) *Attorney, Agent, or Firm*—Baker Botts L.L.P.

(57) ABSTRACT

A tire with a form ratio H/S between 0.3 and 0.8 has a carcass reinforcement (1) which is covered radially by a quasi-cylindrical crown reinforcement (3) and which is tangential at T to a holding circle C. The common tangent at T to the circle C and to the meridian profile of the carcass (1) makes an angle α of between +20° and −80° with respect to a line parallel to the rotation axis and passing through the tangency point T. In its portion located between the tangency point T and the point E of greatest axial width, the carcass reinforcement (1) is provided with a reinforcement armature (6) of circumferentially non-extensible elements. Viewed in meridian cross-section and when the tire is fitted and inflated to the recommended pressure, the carcass (1) has a meridian profile consisting of four circular arcs configured to improve the endurance of the tire while improving its rolling resistance.

9 Claims, 3 Drawing Sheets

TIRE WITH SPECIFIED CROWN REINFORCEMENT AND CARCASS PROFILE

This is a continuation of PCT/EP99/02910, filed Apr. 29, 1999.

BACKGROUND OF THE INVENTION

The present invention concerns a tire with radial carcass reinforcement and more particularly a tire intended for fitting to vehicles carrying heavy loads and driving at sustained speeds, such as trucks, tractors, trailers or coaches.

A tire of the "Heavy Duty" type generally comprises a radial carcass reinforcement formed of a single ply of metallic reinforcement elements anchored in each bead to at least one bead wire. The said carcass reinforcement is radially covered by a crown reinforcement formed by at least two working plies made of non-extensible metallic reinforcement elements, which are mutually parallel within each ply and crossed over from one ply to the next, making angles which may be between 10° and 45° with respect to the circumferential direction of the tire. The said working plies are generally completed by a so-termed protection ply made of extensible metallic reinforcement elements, and either by a so-termed triangulation ply of non-extensible metallic elements oriented with respect to the circumferential direction at an angle greater than 45° in a known way, or by a ply of reinforcement elements oriented circumferentially, or by both the preceding types of ply.

"Heavy Duty" tires have form ratios H/S, H being the height of the tire on its rim and S being the maximum radial width of the tire when fitted on its working rim and inflated to the recommended pressure, ranging between 0.65 and 1.0. However, "Heavy Duty" tires are now appearing which have smaller form ratios H/S, for example of the order of 0.45.

Whatever the type of tire, it is known that a compromise between the various properties required is difficult to achieve, since unfortunately an improvement in one characteristic usually goes together with a degradation of one or more other properties.

Numerous attempts have been made to try and obtain the best compromise, more particularly in the case of cruising tires. With a view to improving comfort, resistance to punctures and the wear resistance of the tread, the British document GB 359 110 proposes to give the tire, during molding in the vulcanization mold, a shape very similar to its shape under load, while the tread is made circumferentially non-extensible by the presence of an armature of circumferentially continuous cables or wires. Thus, the tire is molded with a low form ratio, markedly incurving sidewalls, and a carcass reinforcement anchored on each side of the equatorial plane to a bead-wire such that at the point of tangency between the meridian profile of the carcass reinforcement and the bead wire arid with respect to a line parallel to the tire's rotation axis, the common tangent to the bead-wire and the said profile makes an angle which is open axially towards the outside and radially towards the inside.

To achieve a very clear improvement of the compromise between comfort, road-holding and the stability of the tire, U.S. Pat. No. 3,486,547 describes a tire with a low form ratio H/S, which may be between 0.25 and 0.75, and in which the areas of the sidewall close to the edges of the rim are essentially parallel to the rotation axis of the tire, the said areas being reinforced by radially non-extensible rings and the said rings being of various constitutions. Such a structure entails fitting the tire on a rim whose width W is small compared with the maximum axial width S of the said tire, the ratio W/S being between 0.25 and 0.75.

A similar tire is also described in the patent FR 1 267 264, and is intended to enable a compromise between comfort, road-holding, low rolling resistance and high resistance to wear. In order to increase the structural flexibility of the carcass reinforcement assembly considerably while avoiding the disadvantages that automatically go together with such an increase, the said carcass reinforcement has very curved sidewalls and is covered by a cylindrical crown reinforcement which is circumferentially non-extensible and preferably formed of longitudinal reinforcement elements. Near-the anchoring bead-wires, the carcass reinforcement has portions with tangents that are horizontal or situated at radii smaller than the radii of the rim edges, the said portions being reinforced in the case described by circumferential reinforcement elements.

U.S. Pat. No. 4,029,139 also concerns a tire with a form ratio H/S preferably between 0.40 and 0.60 such that the ratio W/S of the rim width W to the maximum axial width S of the tire is smaller than 0.65. It describes a particular system for fitting the beads to the rim, such that the parts of the bead close to the rim are essentially horizontal.

The development of a "Heavy Duty" type tire and the adaptation to the said tire of the principles mentioned above have proved disappointing. In effect, if comfort is improved the general endurance of the tire is not, whether this applies to endurance in terms of wear or the fatigue endurance of the tire's various reinforcements.

SUMMARY OF THE INVENTION

The object of the invention is to improve the general endurance of this type of tire while at the same time improving its rolling resistance.

The tire according to the invention, which has a form ratio H/S between 0.3 and 0.8, comprises a carcass reinforcement of equatorial radius $R_{SS} \pm \Delta R_{SS}$, where $\Delta R_{SS}$ is equal to 1 times the minimum thickness of the said reinforcement, which is covered radially by an essentially or quasi-cylindrical crown reinforcement formed by at least one working ply, of circumferential reinforcement elements, the said carcass reinforcement, on either side of the equatorial plane, being on the one hand tangential to a circle C termed the holding circle, such that the common tangent to the said circle C and to the meridian profile of the carcass reinforcement makes at the tangency point between the said profile and the holding circle, and with respect to a line parallel to the rotation axis passing through the said tangency point, an angle between +20° and −80°, and on the other hand, in its portion between the said tangency point and the point of greatest axial width, being provided with a reinforcement armature made of circumferentially non-extensible elements. It is characterized in that, viewed in meridian section, and when the tire is fitted on its working rim and inflated to the recommended pressure, the centerline of each half of the main portion of the carcass reinforcement has a meridian profile composed of four circular arcs:

a first circular arc TA of radius $r'_1$, comprised between or equal to the quantities $r_1$, and/or $2r_1$, which is on the one hand tangential to the holding circle C, concentric with the circle of the rim edge of radius $r_1$, and located radially above and separated from the said edge by a distance $e_T$ at least equal to twice the minimum thickness e of the carcass reinforcement, and which on the other hand has a point of intersection A with a second circular arc AE of radius $r''_1$, comprised between the quantities $r_1$ and $2r_1$, which is tangential to the line perpendicular to the rotation axis passing through the point E of greatest axial width, a third circular arc EF of radius $r_2$, which is tangential to the second arc of a circle AE at the point E of greatest axial width and also tangential to a fourth arc of a circle FG, parallel to the quasi-cylindrical crown reinforcement, at a point F separated from the line parallel to the rotation axis and passing through the center $O_J$ of the holding circle C by a distance d, where the quantities d, $r_1$ and $r_2$ satisfy the relationships:

$$d=r_2+(r_1+ar_J+e_T)\cos \alpha \text{ and } r_1=r_2R_{SS}/(R_{SS}-r_2)$$

where $\alpha$ is the angle which the tangent at T makes with respect to a line parallel to the rotation axis, and a is a constant which can have the values −1,0 or +1, and a fourth circular arc FG of radius $R_{TC}$ equal to the transverse radius $R_T$ of the crown reinforcement, reduced by at most the minimum thickness of the carcass reinforcement, and in that the width of the working crown reinforcement is comprised between the distance separating the two tangency points F of the said meridian profile to the crown reinforcement and the said distance increased by $2r_2/3$.

The term 'quasi-cylindrical crown reinforcement' is used to mean a crown reinforcement whose transverse radius of curvature is at least equal to 4 times its equatorial radius of curvature.

The carcass reinforcement is preferably formed of radial reinforcement elements, which may be made of a textile material because of the low stress supported by each reinforcement element, the stress supported being due to the internal inflation pressure and being a function of the meridian profile of the said carcass reinforcement.

It is an advantage for the crown reinforcement to consist on the one hand of an axially continuous ply formed of circumferential non-extensible reinforcement elements, for example metallic cables (elements are termed non-extensible if, under a tensile force equal to 10% of the breaking force, their relative elongation is less than 0.5%), and on the other hand, of the two plies of non-extensible reinforcement elements mutually parallel within each ply and crossed over from one ply to the next, which make an angle between 20° and 60°, and preferably between 40° and 55° with respect to the circumferential direction.

The term 'axial width of the working crown reinforcement' is used to mean the larger of two widths: the axial width of the crown reinforcement ply formed of circumferential elements and the axial width of the narrower of the crown reinforcement plies formed of inclined elements.

On each side of the equatorial plane and in its portion comprised radially between the tangency point to the holding circle and the point of greatest axial width, the carcass reinforcement is completed by a reinforcement armature which is essentially circumferentially non-extensible, the said armature consisting of a simple bead-wire of known type (braided, "packed", with rectangular or other wires), or of at least one ply of non-extensible circumferential elements, preferable metallic, as known in its own right. The said reinforcement armature may be located either inside the carcass reinforcement, or outside it, or between its plies, or in all three of the above positions. The said armature is preferably positioned axially around the point of intersection A of the two circular arcs TA and AE.

Preferably, and in a my known in its own right, the axial distance separating the two tangency points of the meridian profile of the carcass reinforcement to the two holding circles is smaller than two-thirds of the largest axial width of the carcass reinforcement.

The tire is mounted on the rim, in a known way, by beads each of which comprises at least one bead-wire around which the carcass reinforcement is anchored by being folded back upon itself. The folded-back portion may be long enough to be considered an integral part of the reinforcement armature located in the lower position of the tire's sidewall. Due to the meridian profile of the carcass reinforcement, the anchoring bead-wire may have a cross-section smaller than that of the bead-wires currently used in tires of normal shape and having the same axial and radial dimensions. Whenever a carcass reinforcement is folded back upon itself, it is advantageous for the folded-back portion to be located in a zone of low deformation, and it can be lacquered against the main portion of the said reinforcement without the presence of sections between the main and folded-back portions.

The carcass reinforcement can also be held fast in the beads by inserting its edges between two armatures of non-extensible and circumferential reinforcement elements, or between the rim itself and one reinforcement armature as above.

The characteristics and advantages of the invention will be better understood from the description that follows, which refers to the drawings that illustrate exemplary embodiments in a non-limiting way.

DESCRIPTION OF PREFERRED EMBODIMENTS

Figure 1:
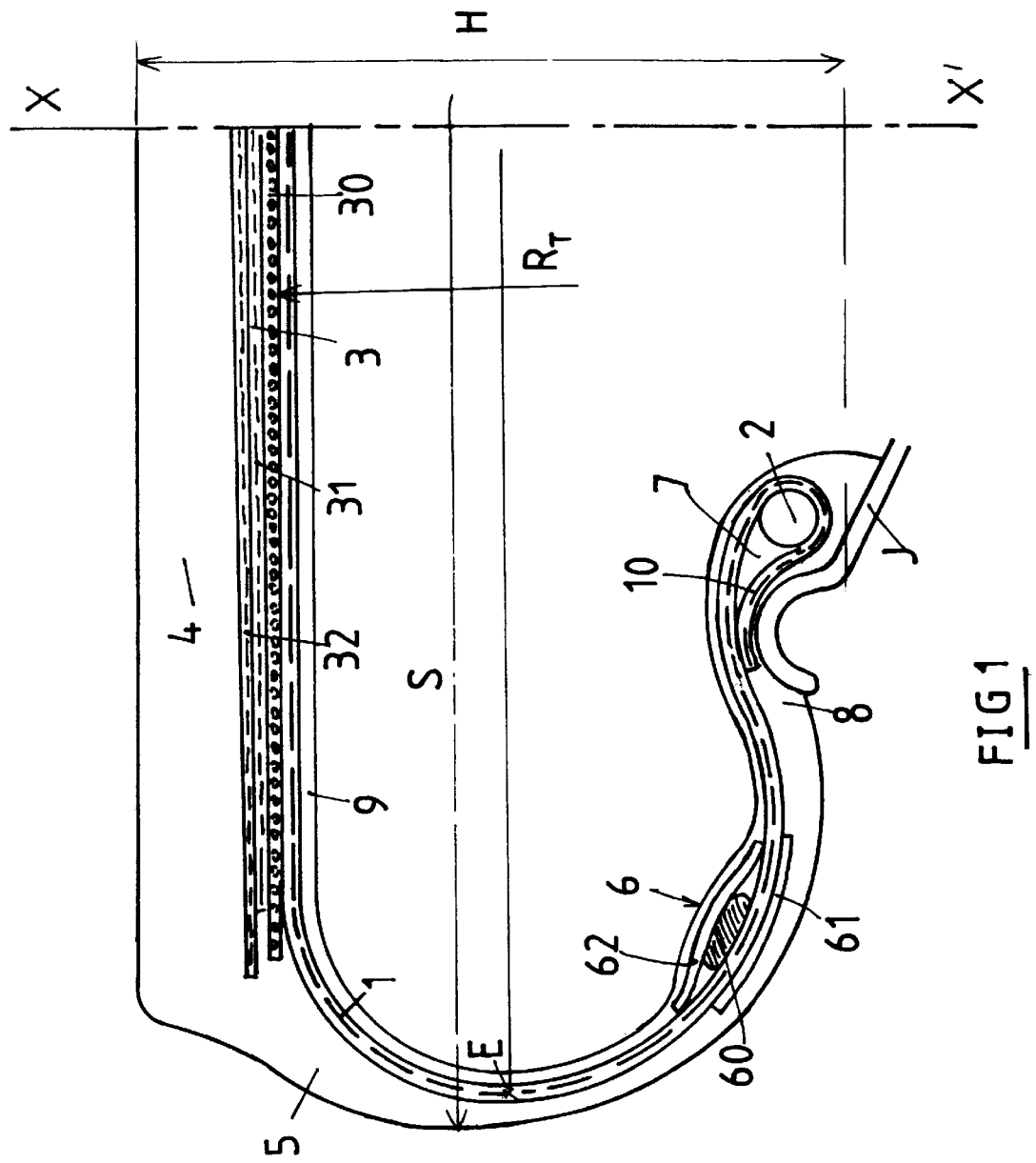
FIG. 1 is a schematic representation of a meridian section showing an overall view of the tire according to the invention.

The tire of FIG. 1 has a form ratio H/S equal to 0.55 and is fitted on a 9×22.5 rim J. The carcass reinforcement 1 is formed of a single ply of metallic reinforcement elements which are cables made of aromatic polyamide. The said ply 1 is anchored in each bead to a bead-wire 2 of the braided type and has a portion 10 folded back upon itself, the meridian profile of the folded-back portion being around the arc of the circle representing the rounded portion of the flange of the rim J. The said folded-back portion 10 is separated from the main portion I of the carcass ply by a small section 7 of triangular shape. Between the point E of maximum axial width of the carcass ply and the bead-wire 2 is arranged the reinforcement armature 6 consisting, in the case described, of a ply 61 of non-extensible metallic cables radially inside the meridian profile of the carcass ply 1, a ply 62 of non-extensible metallic cables radially outside the carcass ply 1, and between the said ply 1 and the ply 62, a reinforcement ring 60 formed by a coil of metallic wires which confer almost perfect extensibility upon the said ring. Tangentially, the carcass ply 1 meets a crown reinforcement 3 consisting, radially on the inside, of a ply 30 of circumferential and non-extensible metallic cables (circumferential cables are ones which make an angle of between +2.5° and −2.5° with respect to the circumferential direction of the tire) and two piles 31 and 32 of non-extensible metallic cables parallel to one another within each ply and crossed over from one ply to the next, which make an angle of 45° with the circumferential direction. The plies 30, 31, 32 constitute what is usually known as the working crown reinforcement, it being understood that the said working reinforcement can be completed by a protection armature consisting of plies with elastic elements. On the outside, the tire is completed by a tread 4, which is joined via two sidewalls 5 to two tire beads which rest against the wheel rim J cushioned by a protective rubber mix 8, and on the inside by at least one layer 9 of rubber mix impermeable to the inflation gases that might be used in the tire.

Figure 2:
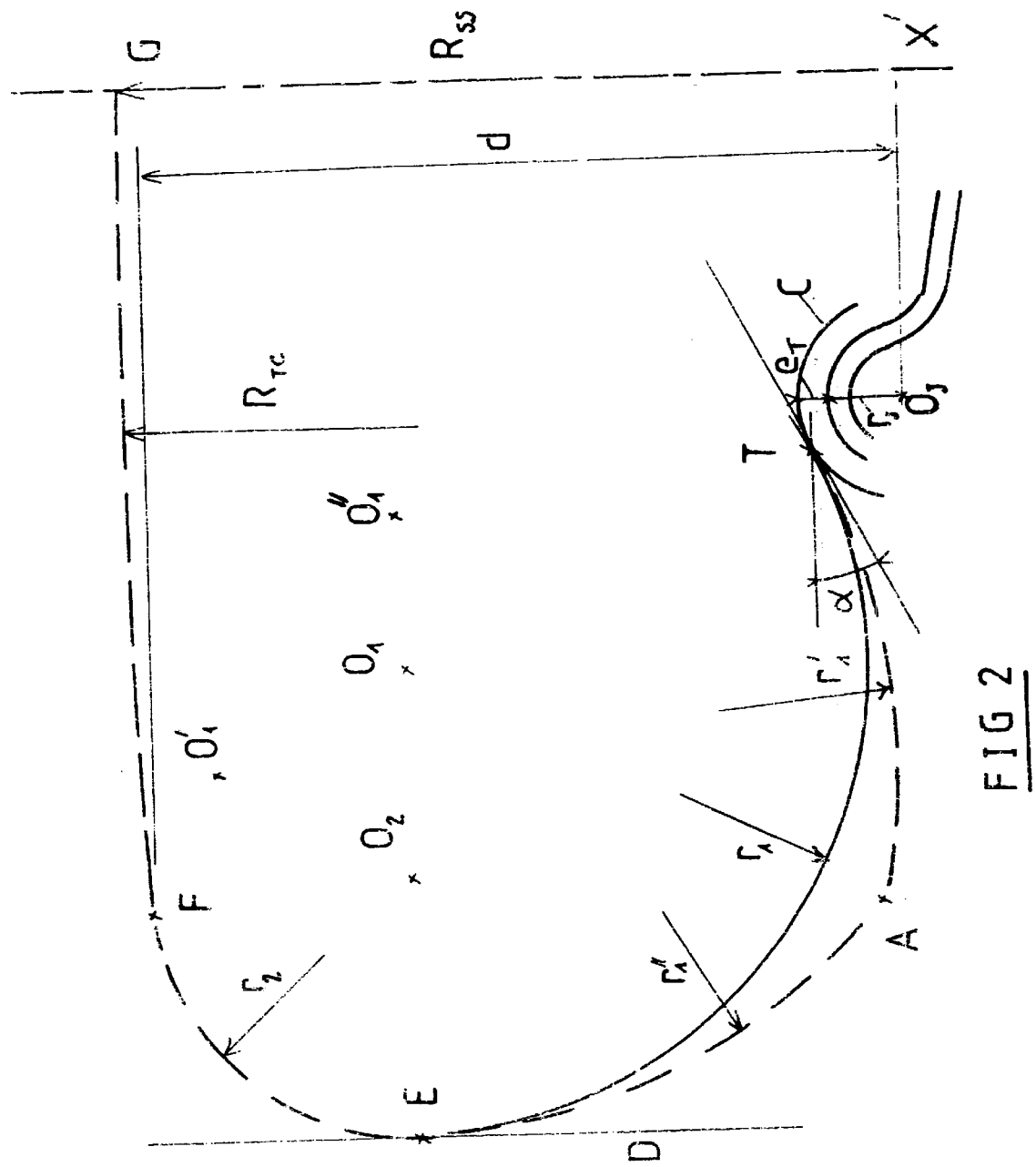
FIG. 2 is a schematic representation, seen in meridian section, of the outline of the meridian profile of the centerline of the carcass reinforcement.

The crown reinforcement 3 is almost cylindrical, since the transverse radius $R_T$ of the radially inside face of the crown ply 30 radially closest to the carcass ply 1 is 5 times its equatorial radius. If the centerline of the main portion of the carcass ply 1 is taken as the line (FIG. 2 broken line) which divides the thickness e of the said portion of the ply not folded back upon itself into two equal parts, the meridian profile of the said centerline, whose equatorial radius $R_{SS}$ is equal to the equatorial radius of the crown reinforcement less a quantity equal to half the thickness e/2 of the ply 1, consists in meridian section, on each side of the equatorial plane, of a circular arc GF centered in the equatorial plane XX', whose radius of curvature is $R_{TC}$ which is equal to $R_{T-e}/2$, since the said arc GF is parallel to the crown ply 30 radially closest to the ply 1. Axially towards the outside and radially towards the inside, the arc GF is extended tangentially at F by the third circular arc EF with center of curvature $O_2$ and transverse radius $r_2$, this circular arc EF being tangential at E, the point of maximum axial width $S_0$ of the meridian profile of the centerline, to the perpendicular D extending from E to the rotation axis of the tire. The maximum width $S_0$ of the meridian profile from the centerline is deducted from the maximum axial width S of the tire, the difference $S-S_0$ being equal to the thickness of the rubber mixes positioned outside the ply 1, the value S being generally a value imposed by the dimensions envisaged by the manufacturer of the vehicle to be fitted. The circular arc EF is extended radially on the inside by the second circular arc EA, with center of curvature $O''_1$ and radius $r''_1$, the latter being larger than the radius $r_2$ of the arc EF. The said arc EA is on the one hand tangential at E to the perpendicular D to the rotation axis, and on the other hand, at A, it intersects the first circular arc AT with center of curvature $O'_1$ and radius $r'_1$, which in the case described is larger than both $r_2$ and $r_1$. The said first circular arc AT is tangential at T to the holding circle C with center of curvature $O_J$ and radius of curvature $r_J+e_T$, the center $O_J$ being the center of the circular arc representing the radially outside wall of the rounded part of the flange of the rim J and consequently having a radius $r_J$ perfectly defined by the type of fitting rim in question, and the quantity $e_T$ being defined by the designer of the tire and being at least equal to twice the minimum thickness of the carcass reinforcement. This tangent common at T to the meridian profile of the centerline of the carcass reinforcement 1 and to the holding circle C makes an angle a with the line parallel to the rotation axis of the tire passing through T, the said angle being open axially towards the outside and radially towards the inside, and being termed negative and equal to 13° in the case described.

If d is used to designate the distance separating the point F on the meridian profile of the centerline of the carcass reinforcement from the center $O_J$ of the outside wall of the rim flange, which is an imposed distance, it is easy to deduce geometrically from these data that in the case of the figure shown and when the constant a is equal to +1, the quantity d is equal to the sum of $r_2$ and the product of cos α with the sum $r_1+r_2+e_T$, namely:

$$d=r_2+(r_1+r_2+e_T)\cos \alpha$$

Given that the radius $r_1$ can be considered equal to $R_{SS}r_2/R_{SS}-r_2$, it is possible to know $r_2$ as a function of known or imposed parameters, namely d, $r_j$, $e_T$, and cos α, $r_2$ being termed the mean radius of the circular arc EF.

The case illustrated in the figure shown (a=+1) corresponds to a rim edge whose center $O_j$ is radially inside the said edge. It is easy to understand that the distance d is equal to:

$$d=r_2+(r_1-r_j+e_T)\cos \alpha$$

in the case when the center $O_J$ of the circle representing the rim edge is radially outside the said edge, when the constant a will be equal to −1. Similarly, when the rim edge can be considered flat, the distance d, will be equal to:

$$d=r_2+(r_1+e_T)\cos \alpha$$

since the constant a will then be equal to zero.

Once the radius of curvature $r_2$ is known, the radius $r_1$ is known and so too are the radii $r'_1$ and $r''_1$. It is then possible to define the centers $O'_1$ and $O''_1$ of the circular arcs EA and AT, to trace them, and to define the tangency point T, given that the geometrical locus of the center $O_J$ is a line parallel to the rotation axis and a known distance $R_{OJ}$ away from that axis.

Figure 3:
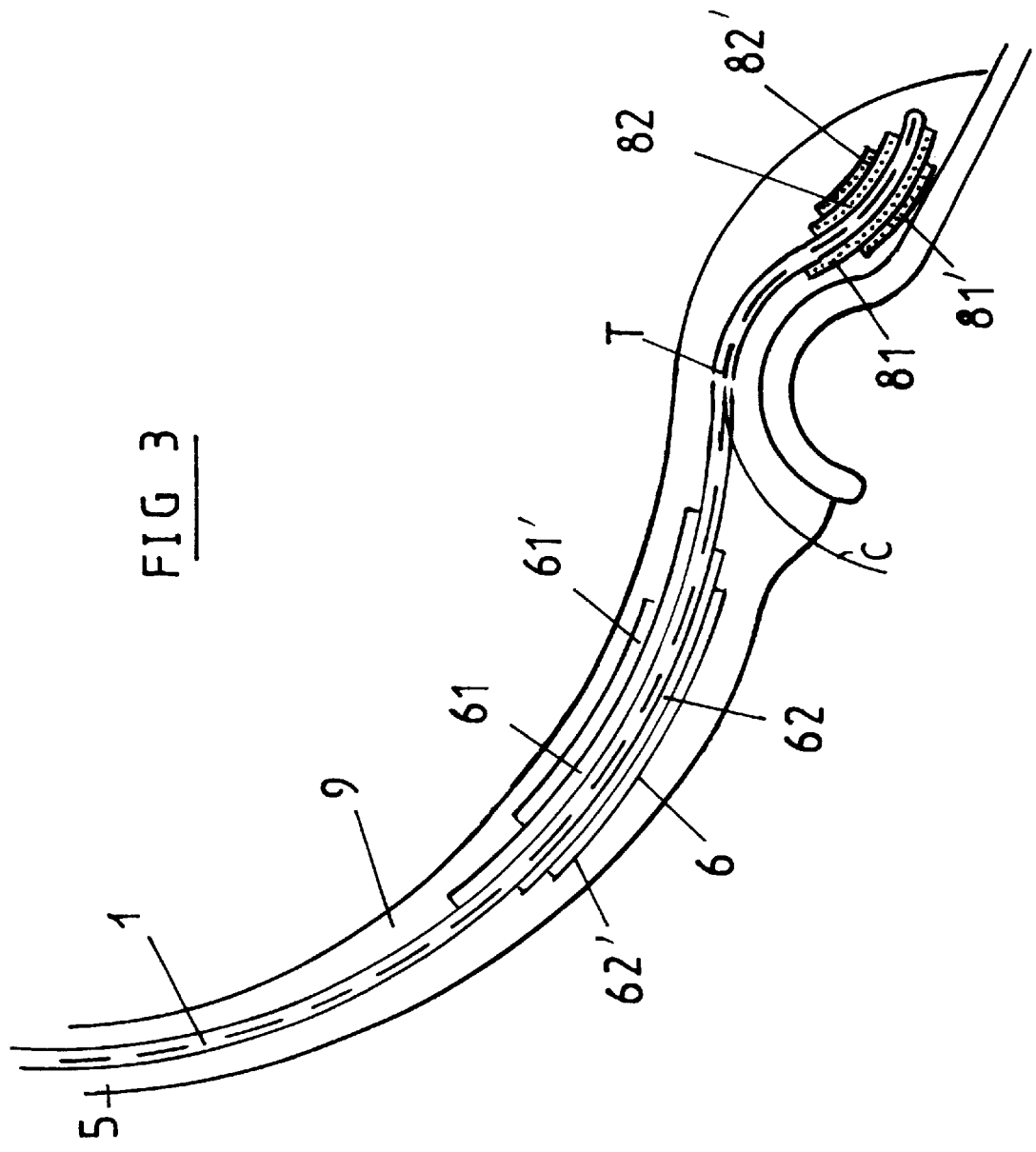
FIG. 3 is a schematic representation of a variant of the meridian profile and the fixing of the crown reinforcement.

FIG. 3 shows a variant of the tire according to the invention. This tire differs from that shown in FIG. 1 in the following respects:

a) The meridian profile of the carcass ply 1 which is tangential to the holding circle C at T, has a common tangent with the said circle which makes an angle α of zero with the line through T parallel to the rotation axis.

b) The carcass reinforcement is not held by a bead-wire but by an assembly of circumferential reinforcement elements, which are in this case metallic steel cables arranged in the form of plies, radially outside and axially inside 82, 82' and radially inside and axially outside 81, 81'.

c) Between the point E of greatest axial width and the tangency point T, the reinforcement armature 6 of the carcass ply 1 also consists of several plies of metallic reinforcement elements, steel cables in this case, on the inside 62, 62' and on the outside 61, 61'.

We claim:

1. A tire, with a form ration H/S between 0.3 and 0.8, comprising a carcass reinforcement (1) of equatorial radius $R_{SS}\pm\Delta R_{SS}$, where $\Delta R_{SS}$ is equal to 1 times the minimum thickness of said carcass reinforcement, covered radially by a crown reinforcement (3) which is essentially quasi-cylindrical, formed of at least one working ply (30) of circumferential reinforcement elements, said carcass reinforcement (1) on each side of the equatorial plane XX', on the one hand being tangential to a circle C termed the holding circle, the common tangent to the said circle C and to the meridian profile of the carcass reinforcement (1) making an angle α, open axially towards the outside and radially towards the inside, between 20° and −80° at the tangency point T between said profile and the holding circle C and with respect to a line parallel to the rotation axis and passing through said tangency point T, and on the other hand, in its portion located between said tangency point T and the point E of greatest axial width, being provided with a reinforcement armature (6) of circumferentially non-extensible elements, the tire characterized in that when viewed in meridian section and when the tire is fitted on its working rim and inflated to the recommended pressure, the centerline of each half of the main portion of the carcass reinforcement (1) has a meridian profile which consists of four circular arcs:

- a first circular arc TA of radium $r'_1$, comprised between or equal to the values $r_1$ and/or $2r_1$, which is on the one hand tangential to the holding circle C, concentric with the rim edge of radius $r_j$, positioned radially above and separated from said edge by a distance $e_T$ at least equal to twice the minimum thickness of the carcass reinforcement, and which, on the other hand, has a point of intersection A with
- a second circular arc AE of radius $r''_1$, comprised between the values $r_1$ and $2r_1$, which is tangential to the line D perpendicular to the rotation axis passing through the point E of greatest axial width,
- a third circular arc EF of radius $r_2$, which is tangential to the second circular arc AE at the point E of greatest axial width and also tangential to a fourth circular arc FG parallel to the quasi-cylindrical crown reinforcement (3), at a point F separated by a distance d from the line parallel to the rotation axis and passing through the center $O_J$ of the holding circle C, such that the quantities d, $r_1$ and $r_2$ satisfy the relationships:

$$d=r_2+(r_1-ar_j+e_t)\cos\alpha \text{ and } r_1=r_2 R_{SS}/(R_{SS}-r_2)$$

where $\alpha$ is the angle between the tangent at T and a line parallel to the rotation axis, and a is a constant which can have the values −1,0 or +1,

- a fourth circular arc FG, a radius of $R_{TC}$ equal to the transverse radius of $R_T$ of the crown reinforcement reduced by at most the minimum thickness of the carcass reinforcement, the tire further characterized in that the width of the working crown reinforcement (3), which is the larger of the axial width of the narrowest ply of circumferential reinforcement elements and the axial width of the narrowest of any plies of inclined reinforcement elements, is comprised between the distance separating the two tangency points F of said meridian profile to the crown reinforcement (3) and said distance increased by $2r_2/3$.

2. A tire according to claim 1, characterized in that the crown reinforcement (3) comprises, on the one hand, an axially continuous ply (30) formed of non-extensible circumferential reinforcement elements, and on the other hand, two plies (31) and (32) of non-extensible reinforcement elements, which are mutually parallel within each ply and crossed over from one ply to the next to make an angle of between 40° and 55° with respect to the circumferential direction.

3. A tire according to claim 1, characterized in that the carcass reinforcement is formed of radial reinforcement elements.

4. A tire according to claim 1, characterized in that on each side of the equatorial plane XX' and in its portion located radially between the tangency point T to the holding circle and the point E of greatest axial width $S_0$, the reinforcement armature (6) that reinforces the carcass reinforcement (1) is essentially circumferentially non-extensible and consists of a simple bead-wire.

5. A tire according to claim 4, characterized in that the reinforcement armature (6) is completed by at least one ply of non-extensible circumferential elements.

6. A tire according to claim 5 in which the non-extensible circumferential elements are metallic.

7. A tire according to claim 1, characterized in that the axial distance separating the two tangency points T of the meridian profile of the carcass reinforcement (1) to the two holding circles C is smaller than two-thirds of the greatest axial width $S_O$ of the carcass reinforcement (1).

8. A tire according to claim 1, characterized in that the tire is mounted on the rim by beads and the carcass reinforcement (1) is anchored in each bead to at least one bead-wire (2) with a portion (10) of the carcass reinforcement (1) folded back over itself.

9. A tire according to claim 1, characterized in that the tire is mounted on the rim by beads, and the carcass reinforcement (1) is held fast in the beads by inserting the edges of said reinforcement between two armatures of non-extensible and circumferential reinforcement elements.

* * * * *

UNITED STATES PATENT AND TRADEMARK OFFICE
CERTIFICATE OF CORRECTION

PATENT NO. : 6,491,077 B1
DATED : December 10, 2002
INVENTOR(S) : Lopez et al.

It is certified that error appears in the above-identified patent and that said Letters Patent is hereby corrected as shown below:

<u>Title page,</u>
Item [73], Assignee, "Generale" should read -- Générale --; and "Establissements" should read -- Etablissements --

<u>Column 1,</u>
Line 49, "incurving" should read -- in-curving --
Line 53, "arid" should read -- and --

<u>Column 2,</u>
Line 10, "Near-the" should read -- Near the --

<u>Column 3,</u>
Line 9, "($r_1$-$\alpha r_j$+$e_T$) should read -- ($r_1$-a$r_j$+$e_T$) --
Line 13, "a" should read -- a -- (boldface)
Line 14, "−1,0" should read -- −1, 0 --
Line 63, "in a my" should read -- in a way --

<u>Column 5,</u>
Line 22, "$R_{T-e}/2$," should read -- $R_T$–e/2, --
Lines 53 and 63, "a" should read -- a --

<u>Column 6,</u>
Line 1, "he" should read -- be --
Line 3, "$r_j$," should read -- $r_J$, --
Line 5, "(a=+1)" should read -- (a=+1) --
Line 6, "Oj" should read -- $O_J$ --
Line 9, "($r_1$_$r_j$+$e_T$) should read -- ($r_1$–$r_j$+$e_T$) --
Line 17, "a" should read -- a --

UNITED STATES PATENT AND TRADEMARK OFFICE
CERTIFICATE OF CORRECTION

PATENT NO. : 6,491,077 B1
DATED : December 10, 2002
INVENTOR(S) : Lopez et al.

It is certified that error appears in the above-identified patent and that said Letters Patent is hereby corrected as shown below:

Column 7,
Line 3, "radium" should read -- radius --
Line 24, "$(r_j-\alpha r_j+e_t)$" should read -- $(r_j-\mathbf{a}r_j+e_T)$ --
Line 28, "–1,0" should read -- –1, 0 --
Line 29, "a radius of" should read -- of radius --

Signed and Sealed this

Twenty-second Day of July, 2003

JAMES E. ROGAN
*Director of the United States Patent and Trademark Office*